United States Patent

[11] 3,611,327

[72] Inventor Wolfgang W. O. G. Kayser
Phoenix, Ariz.

[21] Appl. No. 713,832
[22] Filed Mar. 18, 1968
[45] Patented Oct. 5, 1971
[73] Assignee Honeywell Information Systems, Inc.

[54] MAGNETIC FILM ARRAY
5 Claims, 15 Drawing Figs.

[52] U.S. Cl. .................................................... 340/174 ZB, 117/235, 340/174 HP, 340/174 M, 340/174 TF
[51] Int. Cl. .................................................... G11c 5/02, G11c 7/02, G11c 11/14
[50] Field of Search ........................................ 340/174, 174 TF, 174 M

[56] References Cited

UNITED STATES PATENTS 3,343,145 9/1967 Bertelsen ...................... 340/174

*Primary Examiner*—Bernard Konick
*Assistant Examiner*—Steven B. Pokotilow
*Attorneys*—Edward W. Hughes and Fred Jacob

ABSTRACT: A nondestructive readout memory comprising anisotropic magnetic thin film elements which have a high coercivity material interspersed within a portion of each element for preventing the orientation of the magnetization from rotating to the hard axis.

INVENTOR.
WOLFGANG W.O.G. KAYSER
BY
H Gordon Shields
ATTORNEY

MAGNETIC FILM ARRAY

BACKGROUND OF THE INVENTION

1. Field of the Invention

This invention relates generally to magnetic memories and more specifically to magnetic film memories and to memory arrays.

2. Description of the Prior art

Magnetic materials may be deposited in a continuous thin layer on a sheet or substrate of nonmagnetic material. The resulting thin layer or "thin film," as it is usually referred to, has been found useful as a device for storing digital information in binary form. When magnetic materials are deposited in the presence of a magnetic field, the magnetization of the material (the thin film) is aligned along a preferred axis of magnetization, termed the "easy axis." The axis perpendicularly transverse (or transversely) to the easy axis is referred to as the "hard axis." The magnetization of the film tends to resist motion away from the easy axis. This tendency or property of the film is referred to as "uniaxial anisotrophy," and the thin film is referred to as anisotropic thin film.

The magnetization in anisotropic thin film may be in parallel orientation, with the magnetization in the same direction along the easy axis, or in antiparallel orientation, with part of the magnetization oriented in one direction along the easy axis and part of the magnetization oriented in the opposite direction along the easy axis. A magnetic field of sufficient amplitude may align the magnetization of the film in parallel along the easy axis in either of the two possible directions or stable states of magnetic orientation. One of the two stable states of magnetic orientation may arbitrarily represent a binary 1 and the other may represent a binary 0. A plurality of sites in a continuous thin film may therefore represent a quantity of binary information.

A plurality of parallel conductors, insulated from, but inductively coupled to the film, may overlay the film parallel to the easy axis. These conductors are termed "word drive lines." Another plurality of conductors, called digit drive lines, insulated from the film and from the first set of conductors may overlay the film parallel to the hard axis, or at right angles to the first set of conductors. Information in binary form is stored at memory sites in the film underneath the intersections of the respective conductors. The information is usually organized into "words" or "word lines" parallel to the word drive lines.

Digit drive lines are usually one of two conventional types. The first is termed a "loop" or "haripin" type, in which a single conductor is formed in two parallel segments. That is, two parallel segments joined at one end comprise a single conductor. The second type is a resistor terminated digit line, which simply extends in one direction and is resistor terminated to ground.

To write into the film and thus to establish a memory site, a driving current is sent through a selected word drive line and a driving current is coincidentally sent through a selected digit drive line. While the term "coincidentally" is used, it may be noted that the respective currents are usually not absolutely coincident, but rather are somewhat overlapping. In the current-time relationship, the word drive current usually precedes the digit drive current. The directions of the "coincident" driving currents, or the magnetic fields therefrom, determine the alignment or orientation of the magnetization along the easy axis and thus determine whether a binary 1 or a binary 0 is written or stored. It will be noted that a loop or hairpin digit line orients the magnetization of a continuous film at two locations or sites, and in opposite directions, to comprise a single digit of binary information. Resistor terminated digit lines may be used in parallel (that is, two adjacent lines may be used) to effect the same magnetization orientation of two sites to represent a single binary information digit.

Reading is accomplished by using either a third conductor (or pair of conductors) as a sense line or by using the digit drive lines as sense lines. Whichever may be the case, and whether an information digit is written into a single memory site or into two memory sites, it has been found advantageous to use two lines, either a loop or two resistor terminated lines, for sensing. Noise induced into the sense lines capacitively coupled from the word drive line is cancelled by the use of two lines.

A read current pulse is usually sent through a selected word drive line, and the magnetic field from the current causes rotation of the magnetization of the memory sites in the film underneath the line to rotate to the hard axis. Upon the termination of the pulse, in a destructive readout memory, the magnetization falls back in random antiparallel alignment along the easy axis until another binary digit is written. In a nondestructive readout memory, the magnetization falls back to the easy axis in the original, parallel alignment. The initial rotation of the magnetization, due to the read current, induces a current in the sense line, and that current is "read" as binary digit. The polarity of the current in the sense line, which depends upon the direction of movement of the magnetization, and hence upon the original orientation of the magnetization, determines whether a binary 1 or a binary 0 is read. For a further explanation of some of the discussed items, see "Operating Characteristics of a Thin Film Memory," by J. I. Raffel, published in the *Journal of Applied Physics*, Volume 30, pages 605 through 615, 1959.

A memory array may be fabricated in a continuous thin film. One of the primary problems in such memory arrays is the coupling effect between the magnetization of adjacent memory sites. Boundary lines or walls form around the oriented magnetization in the thin film at the memory sites underneath the intersection of the word and the digit drive lines. These boundaries, also called domain walls, define the area of each memory site. Because of strong coupling effects in the magnetic material, the thin film, the walls generally move outwardly considerable distances beyond the edges of the intersections or "crossovers."

There are several kinds of wall movement mechanisms or processes. One major kind, domain wall creep, is caused by simultaneous action of stray magnetic fields applied perpendicular to a wall (hard axis fields) and parallel to a wall (easy axis fields). Another major kind, domain wall motion by Barkhausen jumps, takes place when applied fields exceed the static wall motion threshold. In referring to the movement of the walls herein, all kinds, as appropriate, are intended or are contemplated, and no specific kind will be identified. The term "wall movement," and similar terms used hereafter, are thus intended to be generically appropriate.

The movement of the walls is partially a function of the applied magnetic fields. The fields applied are generally the lowest possible or practical that will provide the necessary writing and reading, and for any given memory site density, it is necessary or desirable to prevent interaction between adjacent sites by means other than by reducing the fields.

At high memory site storage densities the domain walls defining the storage sites can interfere with adjacent sites by moving out so far that they can be located very close to adjacent lines. The coupling effects of adjacent memory sites cause changes in the output levels of the various sites, increase undesirable output signals or "noise," and generally disturb the normal or desired magnetic pattern of the magnetic material of the individual sites. The adjacent storage or memory sites are therefore disturbed and the site density, or site density capacity, is severely limited.

In the prior art, a storage site is usually made by etching the material away from around the crossover area, thus leaving discrete sites of magnetic film which may be used as memory sites. One of the attendant problems of the prior art is that the memory sites show high demagnetizing effects at their edges because of the abrupt transitions from magnetic material to free space.

Another means used to prevent undesirable coupling between adjacent sites is by the deposition of magnetic material through a mask. This process generally has similar results as the etching process. By depositing the magnetic film through a mask the pattern of magnetic storage sites on the substrate continues to have relatively sharp lines of demarcation, thus adversely affecting the magnetic properties of the site, unless provisions are made to intentionally create a storage site having a tapered edge, as is possible by vapor deposition through a mask.

SUMMARY OF THE INVENTION

This invention relates to magnetic film memory arrays. The memory arrays described and claimed herein have memory sites isolated by the diffusion of a nonmagnetic or a high coercivity material. Adverse magnetic coupling between adjacent memory sites is thus prevented. The magnetic properties of the individual sites are usually not destroyed or hampered because the diffusion zone of the material into the film, which forms the boundaries for the memory sites, can be made quite gradual, as opposed to an abrupt or sharp cutoff as in the prior art. It may be understood that the power of any diffusing agent, such as heat, as for example in the form of a beam, and the time the agent is employed, may determine the actual diffusion characteristics.

Also included in the present invention is a method for making magnetic memory arrays. The method discussed herein has several advantages over the prior art. For example, the etching art work process is completely eliminated, the magnetic film is protected at all times, and high resolution of the diffused areas may be achieved.

Nondestructive readout memory arrays are also disclosed and claimed herein. The arrays include portions of magnetic film in which the coercivity has been selectively altered by the diffusing of material therein. Selectively diffusing a quantity of material, nonmagnetic or of high magnetic coercivity, into a predetermined portion or portions of a memory site alters the magnetic properties of the site and produces unique coupling effects, such as the capability for a nondestructive readout memory. The diffusion techniques discussed herein may be used to accomplish such desirable magnetic coupling effects.

The following are among the objects of this invention:

To provide an improved film memory array;

To isolate memory sites in a magnetic film memory array;

To prevent undesirable coupling between adjacent memory sites in magnetic films;

To vary the coupling effects in film memories by diffusing material into the film;

To provide controlled edge geometries for memory sites;

To improve the memory site density capacity of magnetic film;

To provide a method for diffusing material into a magnetic film so as to isolate discrete memory sites therein; and To provide a film memory array, and a method for making a film memory array, having nondestructive readout capability, by diffusing material into portions of information storage sites.

DESCRIPTION OF THE PREFERRED EMBODIMENTS

Figure 1:
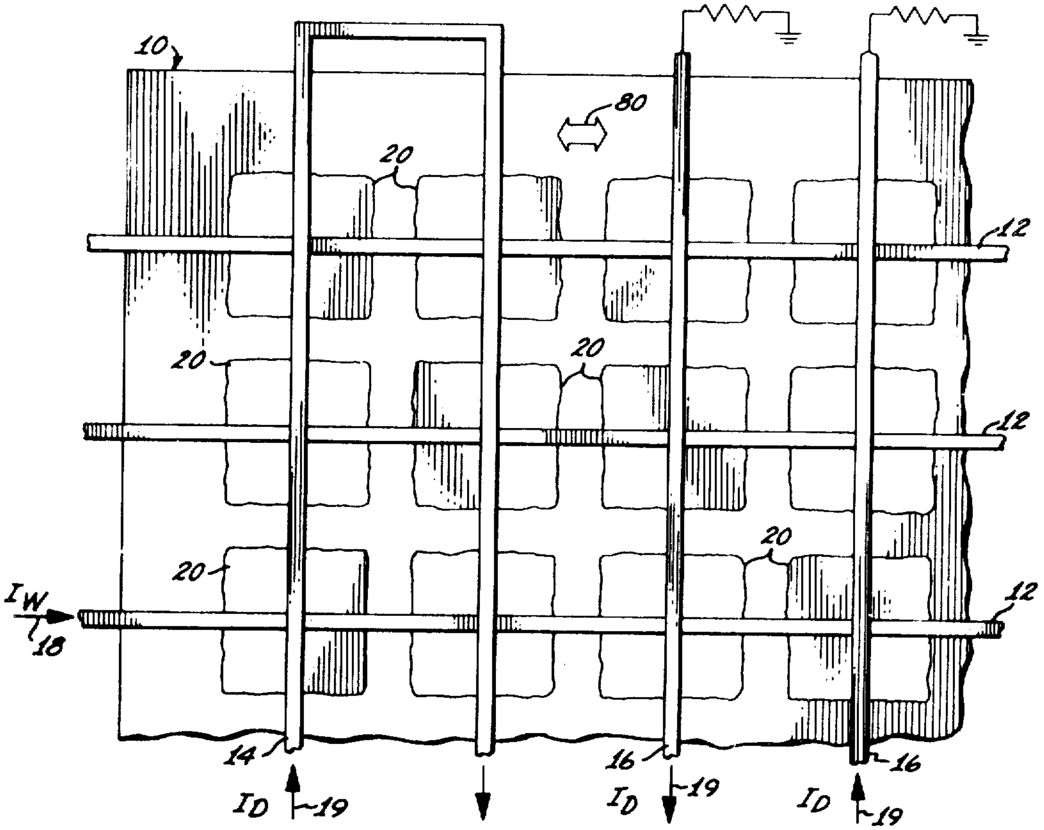
FIG. 1 comprises a plan view of a portion of a magnetic memory array.

FIG. 1 shows a portion of a continuous film magnetic memory array 10 which includes a plurality of word lines 12, and, for illustrative purposes, the two kinds of digit drive lines. A digit drive line of the hairpin or loop variety is illustrated at 14, and parallel thereto are shown two resistor terminated digit drive lines 16. Since the problem of coupling between memory sites is not limited to one or to the other type of digit drive line, both types are shown in FIG. 1. Arrows 18 and 19 adjacent the respective word and digit drive lines indicate, for illustrative purposes, the direction of the driving currents. Underneath each crossover of the digit and word drive lines is shown a memory site 20, a plurality of which comprises the memory portion of the array.

Figure 2:
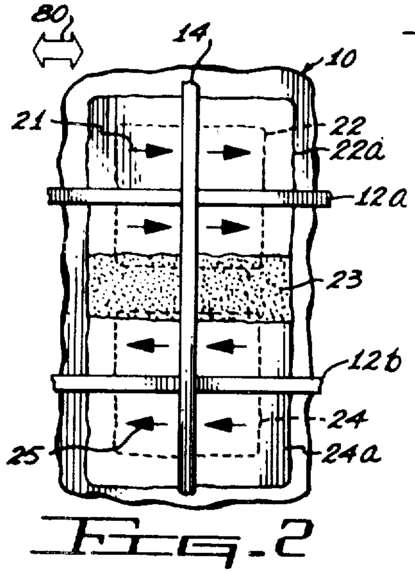
FIGS. 2 and 3 are views of portions of a magnetic memory array illustrating memory site coupling.
Figure 3:
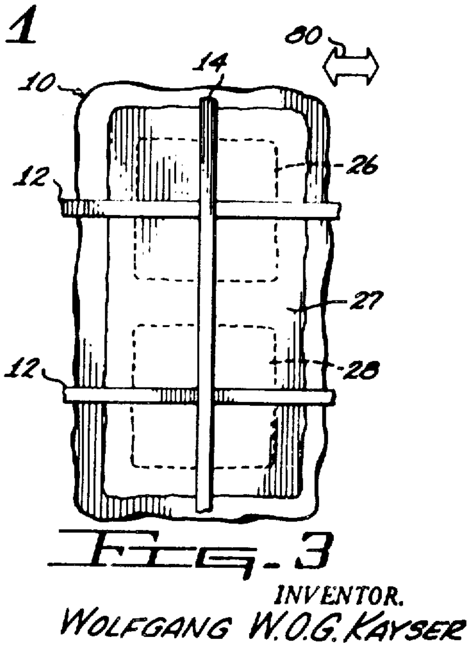

Two examples of memory site coupling from portions of memory array 10 are schematically shown in FIGS. 2 and 3. In FIG. 2, it is assumed that magnetic fields from currents through the word drive lines 12*a* and 12*b* and the digit drive line 14 would orient the magnetization of memory sites 22 and 24 in opposite directions, as represented by arrows 21 and 25. The direction of the easy axis is represented by double arrow 80. By wall movement processes the magnetization from original memory sites 22 and 24 may grow until enlarged memory sites, such as 22*a* and 24*a*, are established. The magnetization of area 23 could include the magnetization of either memory site 22 or 24, depending on which of the word drive lines 12*a* or 12*b* was pulsed at a given time. Either of the memory sites 22*a* or 24*a* could include area 23 and would thus be considerably larger than the adjacent site. Regardless of which site were the larger, such a situation could have an adverse effect on the readout properties of the magnetic material, or film, as previously discussed.

Another situation is shown in FIG. 3, where it is assumed that currents through word drive lines 12 and digit drive line 14 orient the magnetization of the thin film in the same direction along the easy axis, the direction of which is represented by double arrow 80. If such is the case, the individual memory sites 26 and 28 may grow, due to wall movement, until a single memory site or magnetic domain 27 is formed. The formation of the large memory site causes variations in the magnetic pattern of the film and is thus an undesirable occurrence.

It may be understood that the magnetization growth by creep processes may occur in more than one direction, and that the growth and memory site coupling may proceed in all directions rather than merely in the vertical direction illustrated. Regardless of the direction of the growth, the magnetization causes different patterns of readout, noise, and other problems, in film memories.

To limit the wall movement in film memories in accordance with the present invention, a nonmagnetic material, or a material of high coercivity, is diffused into the film in a predetermined pattern, or at predetermined locations, isolating or creating discrete memory sites.

Figures 4, 5, 6, 7, 8:
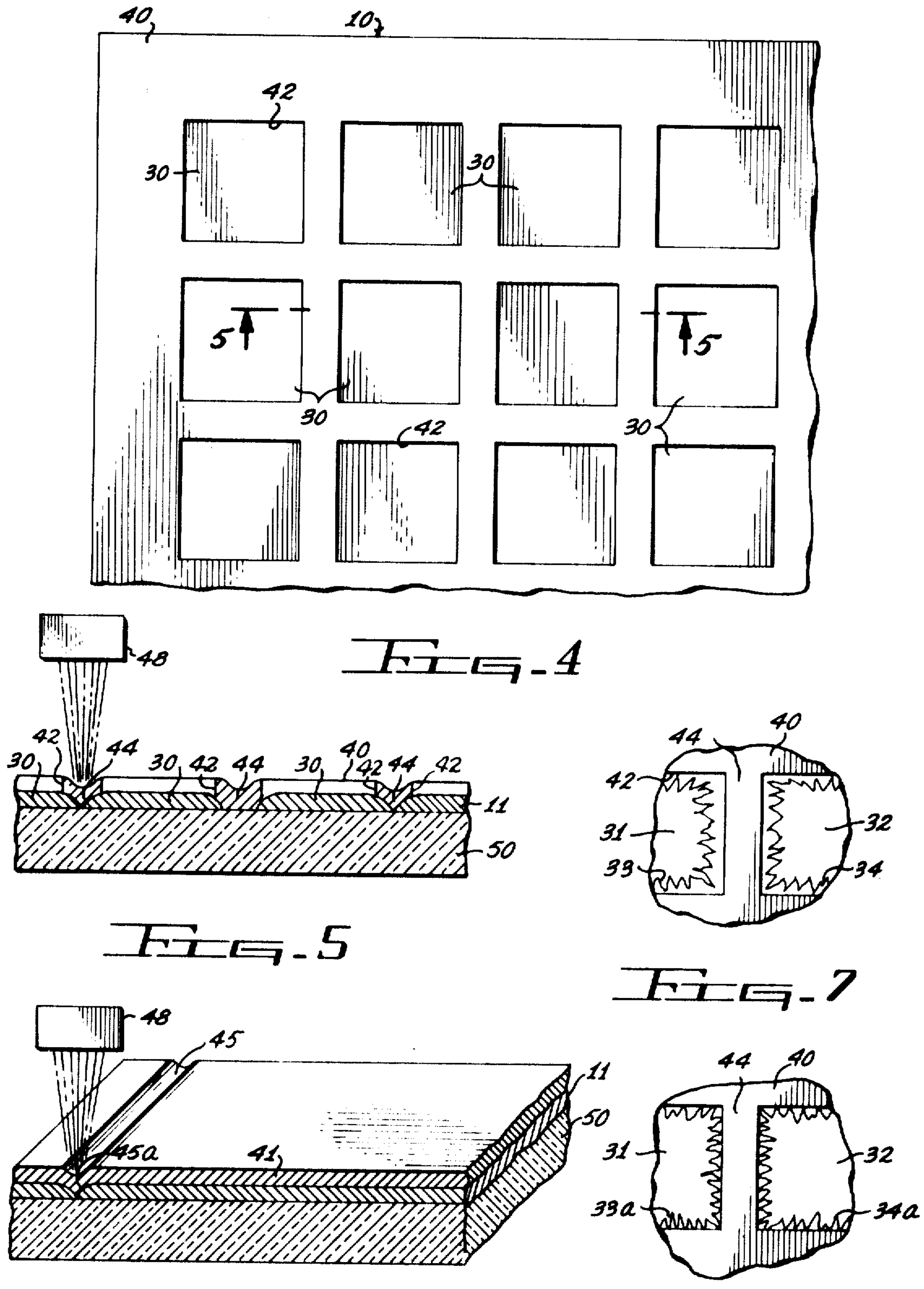
FIG. 4 is a plan view of a portion of a memory array according to an embodiment of the present invention.
FIG. 5 is a view taken partially on line 5—5 of FIG. 4.
FIG. 6 is a sectional perspective view illustrating another form of the present invention.
FIGS. 7 and 8 show progressive domain wall positions with respect to the present invention.

FIG. 4 shows a portion of a continuous magnetic film memory array 10 including a plurality of intended memory sites 30. A layer of high coercivity material or nonmagnetic material 40, such as, respectively, iron, nickel, or nickel-iron in high coercivity proportions, or the like, or copper, gold, aluminum, molybdenum, manganese, or the like, is deposited over a continuous magnetic film in a predetermined pattern, with apertures 42 in the layer 40 overlying the desired memory sites. Appropriate means may then be employed to diffuse portions of, or at least a portion of, the material into the film, as described below.

FIG. 5 illustrates a method for diffusing the high coercivity material into the thin film. This Figure, partially taken on line 5—5 of FIG. 4, shows a substrate 50 with a layer 11 of magnetic material, or thin film, placed thereon, and a layer of nonmagnetic or high coercivity material 40 deposited on the film. After the deposition of the layer 40, a suitable energy source, represented by block 48, such as an electron beam, a laser beam, or some other controllable energy source, may be applied to diffuse portions of the layer 40, in the desired pattern, or at predetermined locations, into the magnetic film surrounding, or between, the intended memory sites 30. By using an electron beam, a laser beam, or the like, the site isolation may be accomplished according to a programmed method, or by various other means well known in the art. Any appropriate means, heat, chemical, or otherwise, may be used to diffuse the material into the film. The diffusion of the material 40 into the layer 11 in the desired pattern isolates memory sites 30 by forming domain boundary runners 44 between the sites 30. The runners then become barriers which prevent the magnetization of the memory sites from enlarging. In this manner, undesirable coupling between adjacent memory sites is prevented.

If desired, a layer of high coercivity material 41 may be deposited continuously or coextensively over the thin film layer 11 without apertures, as illustrated in FIG. 6. An appropriate energy source, as represented by block 48, can then be used to diffuse portions of the material into the film layer in any desired pattern or at any desired locations and to any degree or extent, such as shown at 45. By controlling various parameters of the energy source, such as time, intensity, pattern, etc., the edge geometries can be controlled, thus enabling the diffused material to be tapered as at 45*a*.

FIGS. 7 and 8 show how the diffused high coercivity material separates the magnetic sites and prevents the direct intersite coupling. In FIG. 7 the memory sites 31 and 32 are shown with their domain boundaries as at 33 and 34. A diffused portion or runner 44 separates the memory site 31 from adjacent memory site 32. The boundaries 33*a* and 34*a* are shown in FIG. 8 as having extended to the region of the runner 44. Upon reaching the diffused runner 44 between adjacent magnetic film sites, the wall motion stops, thus preventing direct coupling between the adjacent memory sites, and the information stored therein.

Figure 9:
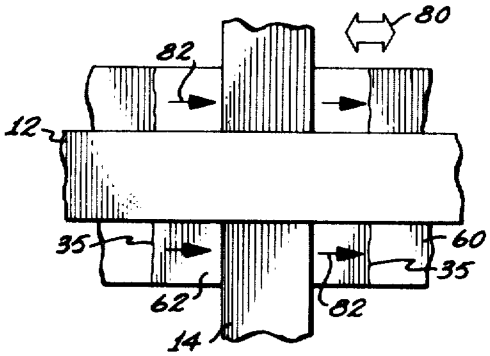
FIGS. 9 and 10 illustrate the present invention as applied to continuous strips of magnetic film.
Figure 10:
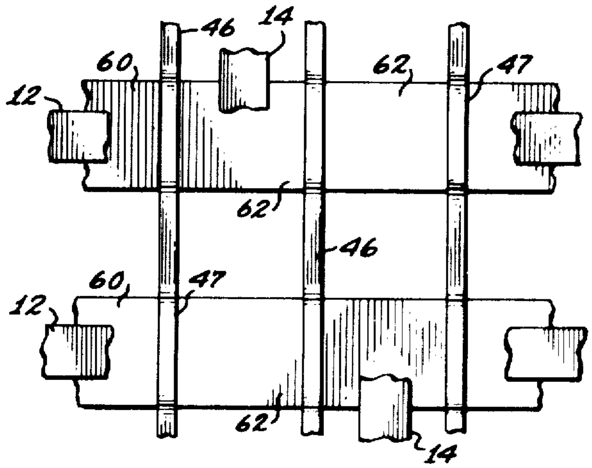

Another application of the present invention is illustrated in FIGS. 9 and 10. A magnetic film memory array may be built in which strips of magnetic thin film are used as the storage media. In the arrangement of FIG. 9, a magnetic film strip 60, continuous in the direction of the easy axis, the direction of which is represented by double arrow 80, comprises an information word line, a portion only of which is shown. A single digit drive line 14 is shown transversely crossing the film strip 60. Word drive line 12 overlays and is parallel to the film strip 60. With such an arrangement, interaction between memory sites on adjacent word lines is substantially reduced because there are no magnetic materials between the word lines. Strong coupling may exist, however, between memory sites along the strip of magnetic thin film. If, for example, a write current is applied along the word drive line 12 parallel to film strip 60 and a current is simultaneously applied along digit drive line 14 so as to orient the magnetization of memory site 62 along the easy axis and in the direction indicated by arrows 82, the domain boundary walls may initially be established as at 35. By creep processes the walls may move along the strip as heretofore discussed. To prevent the domain walls from moving along the strip, or to stop the walls at prescribed locations along the strip, the diffusion technique may be used.

FIG. 10 illustrates an application of the present invention to preventing creep, and the ensuing interaction problems, in film strip memory arrays. A plurality of continuous film strips 60 is shown, perpendicularly crossed by a plurality of ribbons 46 of high coercivity material. Word drive lines 12 and digit drive lines 14 are fragmentarily shown. By diffusing the portions 47 of the ribbons 46 into the magnetic thin film strips, by any of the previously discussed means, effective barriers will be formed that will isolate each of the plurality of memory sites 62. Electrical isolation between film strips may be achieved by severing the ribbons between or adjacent the film strips.

Figure 11:
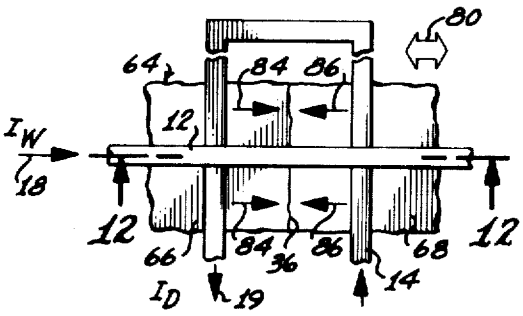
FIG. 11 shows memory sites for storing a single binary digit and a word drive line and a digit drive line for the sites.

The magnetic properties of a film memory site itself may be altered by diffusing material into selective or predetermined portions thereof. For example, a nondestructive readout element may be obtained by changing the coercivity of a particular area of a memory site. FIG. 11 shows an information site 64 for storing a single binary digit. The digit site 64 is comprised of discrete memory sites 66 and 68. The site 64 is crossed by a word drive line 12 and by a hairpin digit drive line 14, and appropriate drive currents $I_W$ and $I_D$ for the word and digit drive lines, respectively, are directionally indicated by arrows 18 and 19. The direction of magnetization of the respective memory sites 66 and 68 is shown by arrows 84 and 86 at a central domain boundary 36 between the sites. The direction of the easy axis of the thin film is designated by double arrow 80.

Figure 12:
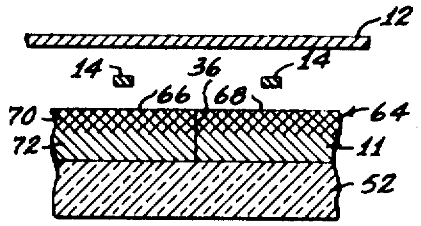
FIG. 12 illustrates an embodiment of a nondestructive readout memory.

FIG. 12 is a partially exploded sectional view of the arrangement of FIG. 11 showing a substrate 52, a layer 11 of magnetic material (thin film), and discrete memory sites 66 and 68 of the digit site 64, separated by central domain boundary 36. Word drive line 12 and sections of digit drive line 14 are also shown. Insulating layers between the layer 11 and the lines 12 and 14 have been omitted. The layer 11 is divided into two portions, a top portion 70 and a bottom portion 72. The magnetic characteristics of the top portion 70 have been selectively altered or varied from those of the lower portion 72 by having nonmagnetic or high coercivity material diffused into it. The coercivity of the top portion is thus somewhat greater than that of the lower portion.

The field from a read current is sufficient to rotate the magnetization of the high coercivity portion 70 only part way to the hard axis, and the magnetization of that portion will thus fall back to the easy axis in the same alignment as originally written into the site. The same field from the read current is sufficient to rotate the magnetization of the lower portion 72 of the magnetic film to the hard axis. But the magnetization, instead of falling back to the easy axis in a random antiparallel manner as is typical in destructive readout magnetic film memories, will tend to fall back in the original alignment due to the biasing action or magnetic coupling of the portion 70. Effectively, then, the diffused material provides nondestructive readout capability in the magnetic film.

Figure 13:
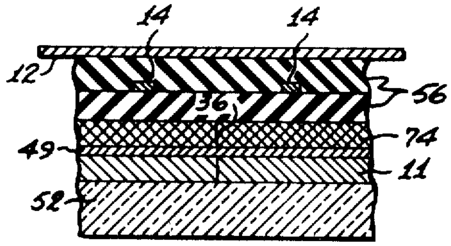
FIG. 13 illustrates a variation of the embodiment of FIG. 12.

A variation of the structure of FIG. 12 is shown in FIG. 13. Under some circumstances it may be necessary or desirable to provide a separate coupling layer of nonmagnetic or high coercivity material. A layer 11 of magnetic material is deposited on substrate 52 and an intermediate coupling layer 49 of nonmagnetic or high coercivity material is deposited on top of layer 11. Another layer of magnetic material is then deposited on top of the layer 49. Nonmagnetic or high coercivity material is then diffused into the top layer of magnetic material, and a layer 74 of higher coercivity magnetic material results therefrom. The vertical magnetic coupling action at readout between layers 11 and 74 is substantially the same as described in the preceding paragraph.

Insulating layers 56, disposed between word drive line 12 and digit drive lines 14, and between digit drive lines 14 and layer 74, are also shown in FIG. 13. The insulating layers have been previously omitted from other pertinent views for purposes of clarity.

Figure 14:
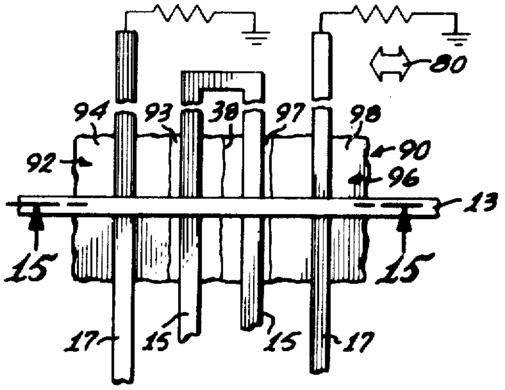
FIG. 14 shows another embodiment of nondestructive readout and memory sites and the overlying circuitry therefor.
Figure 15:
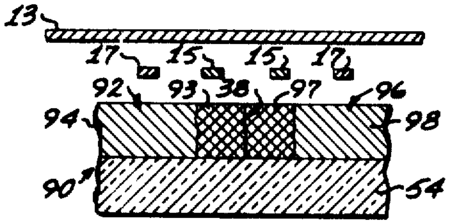
FIG. 15 is a partially exploded cross-sectional view of the arrangement of FIG. 14 taken on line 15—15 of FIG. 14.

A modification of the embodiments illustrated in FIGS. 11, 12, and 13, is shown in FIGS. 14 and 15. The Figures show a digit information site 90 which includes two memory sites 92 and 96 separated by domain boundary 38. A word drive line 13 is shown crossing the digit site 90 and a hairpin digit drive line 15 is oriented over high coercivity portions 93 and 97 of the memory sites 92 and 96 respectively. Resistor terminated sense lines 17 are disposed transversely to the word line 13 and they overlay low coercivity portions 94 and 98 of sites 92 and 96 respectively. The direction of the easy axis is represented by double arrow 80.

FIG. 15 is a partially exploded sectional view of FIG. 14, omitting the insulation between the magnetic film and the drive and sense lines. A layer of magnetic film is deposited on a substrate 54, as in the prior embodiments. A central domain boundary 38 separates the two storage sites 92 and 96 and the portion of the thin film layer adjacent the boundary 38 is divided into portions 93 and 97 respectively. A quantity of high coercivity or nonmagnetic material is diffused into the portions 93 and 97, changing the coercivity of those portions as desired, and increasing the coercivity above that of the portions 94 and 98.

Coincident currents through word drive line 13 and digit drive line 15 orient the magnetization in memory sites 92 and 96 along the easy axis to store a binary digit. A read current through word line 13 should be of sufficient strength to rotate the magnetization of the low coercivity portions 94 and 98 of memory sites 92 and 96, respectively, to the hard axis, but should not be of sufficient strength to rotate the magnetization of high coercivity portions 93 and 97 all the way to the hard axis. The complete rotation of low coercivity portion 94 and 98 will induce a current in sense lines 17 for readout purposes. When the read current is turned off, the magnetization of the low coercivity portions of the memory sites will fall back to its original alignment along the easy axis due to the biasing effect of the magnetization of the high coercivity portions 93 and 97, thus providing another form of nondestructive readout memory.

It may be seen that the diffusion of material into magnetic film to isolate memory sites is highly advantageous in the fabrication of magnetic thin film memory arrays. By isolating each memory site the problems of undesirable direct magnetic coupling are substantially eliminated, and the magnetic properties are enhanced, providing for a more even distribution of the signal pattern which emanates from each site. By substantially eliminating the coupling problems, and the interference, noise, and faulty signals which result from such problems, it is obvious that the packing density capacity of magnetic film memories may be increased or that the general operation may be improved. Moreover, the diffusion of high coercivity (or nonmagnetic) material into selective or predetermined portions of film memory sites and in selective or predetermined quantities, can alter the magnetic characteristics of the sites to produce desirable coupling effects, such as nondestructive readout capability.

While the principles of the invention have now been made clear in illustrative embodiments, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:

1. A nondestructive readout memory array comprising, in combination: a substrate for supporting magnetic film; a magnetic film disposed on said substrate for storing digital information at a plurality of digit sites therein, said film having an easy axis of magnetization and a hard axis of magnetization, and each of said digit sites comprising two memory sites having a domain boundary therebetween; means for orienting the magnetization of the film along the easy axis at the memory sites for storing digital information; means for rotating the magnetization of a first portion of the film at said memory sites to the hard axis to read information stored in the film; and means at said memory sites for preventing rotation of the magnetization of a second portion of the film to the hard axis, said means for preventing rotation of the magnetization to the hard axis includes high coercivity material interspersed within the second portion of the magnetic film.

2. The memory array of claim 1 in which the second portion of the film is adjacent the domain boundary.

3. The memory array of claim 1 in which the second portion of the film is disposed remotely from the substrate.

4. A nondestructive readout memory array comprising, in combination: anisotropic magnetic material of relatively low coercivity, having an easy axis of magnetization and a hard axis of magnetization, for storing information at a plurality of memory sites; means for orienting the magnetization of the material along the easy axis at said memory sites; means for rotating the magnetization of a first portion of the material substantially to the hard axis to read out the stored information; and means for returning the magnetization to its orientation along easy axis, said means for returning the magnetization including material of relatively high coercivity interspersed within a second portion of the magnetic material for preventing the magnetization of said second portion of the magnetic material from rotating substantially to the hard axis.

5. The array of claim 4 in which the means for returning the magnetization includes a layer of material of relatively high coercivity disposed intermediate the first and second portions of the magnetic material.